US009328320B2

(12) United States Patent
Voets et al.

(10) Patent No.: US 9,328,320 B2
(45) Date of Patent: May 3, 2016

(54) MAINTENANCE LIQUID FOR INKJET PRINTERS

(71) Applicant: AGFA GRAPHICS NV, Mortsel (BE)

(72) Inventors: Raphael Voets, Mortsel (BE); Jaymes Van Luppen, Mortsel (BE); Eric Hoes, Mortsel (BE); Johan Loccufier, Mortsel (BE)

(73) Assignee: AGFA GRAPHICS NV, Mortsel (BE)

( * ) Notice: Subject to any disclaimer, the term of this patent is extended or adjusted under 35 U.S.C. 154(b) by 0 days.

(21) Appl. No.: 14/783,276

(22) PCT Filed: Apr. 15, 2014

(86) PCT No.: PCT/EP2014/057588
§ 371 (c)(1),
(2) Date: Oct. 8, 2015

(87) PCT Pub. No.: WO2014/173727
PCT Pub. Date: Oct. 30, 2014

(65) Prior Publication Data
US 2016/0068790 A1    Mar. 10, 2016

(30) Foreign Application Priority Data

Apr. 24, 2013   (EP) ..................................... 13165046

(51) Int. Cl.
| | | |
|---|---|---|
| *B41J 2/165* | (2006.01) | |
| *C11D 7/50* | (2006.01) | |
| *C11D 7/04* | (2006.01) | |
| *C09D 9/00* | (2006.01) | |
| *C09D 103/08* | (2006.01) | |
| *C09D 11/54* | (2014.01) | |

(52) U.S. Cl.
CPC ............ *C11D 7/5022* (2013.01); *B41J 2/16552* (2013.01); *C09D 9/005* (2013.01); *C09D 11/54* (2013.01); *C09D 103/08* (2013.01); *C11D 7/04* (2013.01); *B41J 2002/16558* (2013.01)

(58) Field of Classification Search
CPC .................. B41J 2/16552; B41J 2002/16558; C09D 9/00; C09D 9/005; C09D 11/101; C09D 11/54; C09D 101/28; C09D 103/08; C09D 103/30; C11D 7/5022; C11D 7/04; C11D 7/50; C11D 7/86; C11D 7/5004
See application file for complete search history.

(56) References Cited

U.S. PATENT DOCUMENTS

| | | | | |
|---|---|---|---|---|
| 8,038,254 | B2 * | 10/2011 | Arai ..................... | C09D 11/322 347/28 |
| 8,393,724 | B2 * | 3/2013 | Imamura .............. | C09D 11/322 106/31.13 |
| 2006/0293412 | A1 | 12/2006 | Chou | |
| 2011/0045252 | A1 | 2/2011 | Rasch et al. | |
| 2011/0234692 | A1 | 9/2011 | Haijima et al. | |
| 2013/0063535 | A1 | 3/2013 | Yoda et al. | |

FOREIGN PATENT DOCUMENTS

| | | |
|---|---|---|
| EP | 1 837 182 A1 | 9/2007 |
| EP | 2 053 101 A1 | 4/2009 |
| EP | 2 157 163 A1 | 2/2010 |
| EP | 2 199 273 A1 | 6/2010 |
| EP | 2 161 290 A1 | 10/2010 |

OTHER PUBLICATIONS

Official Communication issued in International Patent Application No. PCT/EP2014/057588, mailed on Aug. 6, 2014.

* cited by examiner

*Primary Examiner* — Anh T. N. Vo
(74) *Attorney, Agent, or Firm* — Keating and Bennett, LLP

(57) ABSTRACT

A maintenance liquid for inkjet printers includes at least 50 wt % of at least one ether solvent according to Formula (I) or (II) with the wt % based on the total weight of the maintenance liquid:

$$R^1(CO)_x(OR^2)_yOR^3 \qquad \text{Formula (I), and}$$

$$R^4CO(OR^5)_zOCOR^6 \qquad \text{Formula (II), wherein}$$

$R^1$, $R^4$ and $R^6$ independently represent an alkyl group having 1 to 4 carbon atoms; $R^2$ rand $R^5$ independently represent an ethylene group or a propylene group; $R^3$ represents a hydrogen atom or an alkyl group having 1 to 4 carbon atoms; x represents an integer of 0 or 1; y and z independently represent an integer of 1 to 4; and wherein the maintenance liquid contains no more than 25 ppm of peroxide expressed as hydrogen peroxide.

15 Claims, No Drawings

MAINTENANCE LIQUID FOR INKJET PRINTERS

CROSS-REFERENCE TO RELATED APPLICATIONS

This application is a 371 National Stage Application of PCT/EP2014/057588, filed Apr. 15, 2014. This application claims the benefit of European Application No. 13165046.7, filed Apr. 24, 2013, which is incorporated by reference herein in its entirety.

BACKGROUND OF THE INVENTION

1. Field of the Invention

The present invention relates to a maintenance liquid for inkjet printers and a method for cleaning inkjet print heads and inkjet printers using the same.

2. Description of the Related Art

Printing systems, such as offset and flexography, are being increasingly replaced for printing applications, such as billboards, packaging and decoration, by industrial inkjet printing systems due to their flexibility in use, e.g. variable data printing, and due to their enhanced reliability, allowing their incorporation into production lines. Radiation curable inkjet inks are particularly preferred because high quality images can be printed on non-absorbing ink-receivers.

In an industrial environment, the inkjet inks in the inkjet printer can be replaced with a different type of inkjet inks for having e.g. a superior adhesion result on a difficult substrate, or an inkjet printer can be set on non-active because of too high production capacity. In such cases of an ink swap or a long standstill, the inkjet ink is normally discharged from the inkjet printer and the inkjet printer is cleaned and filled with maintenance liquid.

Such maintenance liquids are well-known in the art for aqueous inkjet ink printers. For example, US 2007132807 A (SEIKO EPSON) discloses a maintenance liquid for ink jet recording comprising water, a resin solvent, and a moisturizing agent.

EP 1621348 A (TOSHIBA TEC) discloses a washing solution for washing an UV curable inkjet ink inkjet printer head, which contains not less than 50 parts by weight of a polymerizable compound selected from the at least two kinds of polymerizable compounds included in the ink and having the lowest viscosity among the at least two kinds of polymerizable compounds, or not less than 50 parts by weight of a polymerizable compound having a viscosity of 30 mPa·s or less at ordinary temperature. The use of polymerizable compounds in the washing solution is not only an expensive solution, but also holds the risk of undesired polymerization of the washing solution in the print head and the ink circuit.

EP 1837182 A (FUJIFILM) discloses an ink washing liquid for a photocurable ink comprising at least one type of ether compound for cleaning the surroundings of the discharge orifice of the inkjet print head (see [0006]). For this reason, the ether compound preferably has a boiling point of 50° C. to 150° C. (see [0030]) so that little residual washing liquid remains on the nozzle plate of the inkjet print head after cleaning. Due to their fast evaporation, such washing liquids are not really suitable as a maintenance liquid for filling the inkjet print head and the ink circuit of an inkjet printer for a prolonged time.

EP 2157163 A (TOYO INK) discloses a maintenance liquid for inkjet printers comprising at least one of glycol ethers and glycol esters and 45 to 10 mg/L of dissolved oxygen. A large amount of oxygen dissolved in the maintenance liquid may lead to the creation of gas bubbles in the ink circuit of the inkjet printer. Nowadays, industrial inkjet printers include for reliable inkjet printing a degassing unit as, for example, shown in FIG. 7 WO 2006/064036 A (AGFA). The degassing unit is normally also used in the cleaning operation of the inkjet printer for preventing gas accumulation in some parts of the ink circuit, where subsequently ink may dry or solidify.

There is a still a need for an improved maintenance liquid which has high stability, excellent cleaning properties and is suitable for filling the print head and ink circuit during a long standstill of the inkjet printer.

SUMMARY OF THE INVENTION

In order to overcome the problems described above, preferred embodiments of the present invention have been realised with a maintenance liquid as defined below.

It was surprisingly found that problems of failing nozzles in an inkjet print head after cleaning an inkjet printer and refilling it with UV curable inkjet ink were caused by peroxides present in the maintenance liquid used for cleaning the printer.

Peroxides (R—O—O—R) are chemical substances that contain a reactive peroxo unit. Even under normal storage conditions, peroxides can be formed and accumulated by the reaction of a peroxidizable compound with free radicals and molecular oxygen through a process called auto-oxidation or peroxidation. This can occur even when the containers appear to be tightly closed. Ether solvents having one or more hydrogen atoms in alpha position to the oxygen are peroxidizable compounds that are very susceptible to auto-oxidation.

The use of a maintenance liquid having controlled peroxide content is advantageously used for its cleaning properties and for filling inkjet print heads and ink circuits during a long standstill of the inkjet printer.

Further objects and advantages of the invention will become apparent from the description hereinafter.

DETAILED DESCRIPTION OF THE PREFERRED EMBODIMENTS

Maintenance Liquids

A maintenance liquid for inkjet printers according to a preferred embodiment of the invention includes at least 50 wt % of at least one ether solvent according to Formula (I) with the wt % based on the total weight of the maintenance liquid:

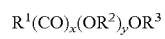  Formula (I) and

  Formula (II), wherein, $R^1$, $R^4$ and $R^6$ independently represent an alkyl group having 1 to 4 carbon atoms;

$R^2$ rand $R^5$ independently represent an ethylene group or a propylene group;

$R^3$ represents a hydrogen atom or an alkyl group having 1 to 4 carbon atoms;

x represents an integer of 0 or 1;

y and z independently represent an integer of 1 to 4; and wherein the maintenance liquid contains no more than 25 ppm of peroxide expressed as hydrogen peroxide.

The at least one ether solvent according to Formula (I) or (II) preferably has a boiling point of at least 160° C., more preferably at least 175° C. and most preferably at least 210° C., all measured at 760 mm Hg. The higher the boiling point, the less evaporation is observed at the nozzles of the inkjet print head.

The maintenance liquid includes the at least one ether solvent according to Formula (I) or (II) in an amount of at least 50 wt %, preferably at least 70 wt %, more preferably at least 80 wt % and most preferably at least 85 wt %, all based on the total weight of the maintenance liquid.

The maintenance liquid may contain three or four different ether solvents, but preferably contains only one or two ether solvents.

The maintenance liquid should also have good wetting properties. A surfactant can be used to accomplish this, but a proper selection of the ether solvent can avoid this, thereby allowing a simpler composition and a diminished risk on foaming during transport.

The maintenance liquid preferably has a viscosity at 25° C. of less than 15 mPa·s, more preferably less than 10 mPa·s. A low viscosity allows discharging the maintenance liquid without heating the print head or ink circuit. For example, the use of propylene glycol phenyl ether having a boiling point of 243° C. as maintenance liquid would require heating most inkjet print heads and ink circuits, since it has a viscosity of 25.2 mPa·s at 25° C. Furthermore, a surfactant may be necessary since the surface tension of propylene glycol phenyl ether is 38.1 mN/m at 25° C.

The maintenance liquid contains no more than 25 ppm of peroxide, preferably no more than 10 ppm of peroxide, more preferably no more than 5 ppm of peroxide, and most preferably no more than 2 ppm of peroxide, all expressed as hydrogen peroxide.

The maintenance liquid may contain no peroxide, but preferably contains a small amount of peroxide. Many peroxides are used as a bleaching additive to detergents and cleaning products. It is believed that a small amount of peroxides enhances the cleaning properties in an inkjet printer, without causing undesired side reactions. The maintenance liquid preferably contains 0.1 ppm, more preferably 0.5 ppm, both expressed as hydrogen peroxide.

The maintenance liquid preferably contains no or only a small amount of polymerizable compounds, such as (meth) acrylate monomers and oligomers. A small amount of polymerizable compounds can be helpful in cleaning the inkjet printer from UV curable inkjet ink, especially UV curable (meth)acrylate based inkjet inks which are cured by free radical polymerization. The maintenance liquid preferably contains polymerizable compounds having an ethylenically unsaturated polymerizable group in an amount of no more than 25 wt %, more preferably no more than 10 wt % and most preferably 0 wt % of polymerizable compounds, wherein all wt % are based on the total weight of the maintenance liquid. The maintenance liquid preferably contains also no cationically curable compounds, such as oxetanes or epoxides, because acid impurities in the maintenance liquid can start undesired polymerization which is hard to stop.

The maintenance liquid contains preferably less than 10.0 mg/L of dissolved oxygen, more preferably less than 9.5 mg/L of dissolved oxygen and most preferably less than 8.5 mg/L of dissolved oxygen. Higher than 10.0 mg/L of dissolved oxygen leads to gas bubbles in the ink circuit and to less efficient cleaning.

Ether solvents according to Formula (I) or (II) and their preparation are well-known to the person skilled in the art.

A single ether solvent or a combination of two, three or more ether solvents according to Formula (I) or (II) may be used.

Suitable ether solvents according to Formula (I) for the maintenance liquid may be selected from ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, dipropylene glycol monomethyl ether butyrate, ethylene glycol monobutyl ether, propylene glycol monomethyl ether, propylene glycol monobutyl ether, diethylene glycol monoethyl ether, diethylene glycol diethyl ether, diethylene glycol monobutyl ether, diethylene glycol dibutyl ether, diethylene glycol methyl ethyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, tripropylene glycol monomethyl ether, tetraethylene glycol dimethyl ether, and tetraethylene glycol diethyl ether.

Suitable ether solvents according Formula (II) for the maintenance liquid may be selected from ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, and dipropylene glycol acetate dibutyrate.

In a preferred embodiment, the maintenance liquid includes at least one ether solvent according to Formula (I) or (II) selected from the group consisting of dipropylene glycol n-butyl ether, tripropylene glycol n-butyl ether, dipropylene glycol n-propyl ether, dipropylene glycol dimethyl ether, tripropylene glycol methyl ether, tetraethylene glycol dimethyl ether, diethylene glycol ethyl ether acetate, dipropylene glycol diacetate, dipropylene glycol monomethyl ether acetate and diethylene glycol n-butyl ether acetate.

In a preferred embodiment, the maintenance liquid for inkjet printers according to a preferred embodiment of the invention includes at least 50 wt % of at least one ether solvent according to Formula (I) with the wt % based on the total weight of the maintenance liquid:

$$R^1(CO)_x(OR^2)_yOR^3 \qquad \text{Formula (I), wherein,}$$

$R^1$ represents an alkyl group having 1 to 4 carbon atoms;
$R^2$ represents an ethylene group or a propylene group;
$R^3$ represents a hydrogen atom or an alkyl group having 1 to 4 carbon atoms;
x represents an integer of 0 or 1;
y independently represent an integer of 1 to 4.

The maintenance liquid is preferably stored in a tightly closed container, preferably a sealed container, like a jerry can, wherein the headspace is filled with an inert gas like nitrogen.

Removal of Peroxides

The removal of peroxide impurities in ether solvents is well-known to a person skilled in the art. A method for reducing the peroxide content using ferrous sulphate is given below merely as an example.

For treating 500 mL of ether solvent, first a composition according to Table 1 is prepared.

TABLE 1

| Component | Composition |
|---|---|
| Ferrous sulphate | 60 g |
| Concentrated sulphuric acid | 6 mL |
| Distilled water | 100 mL |

Water is introduced by this method. Therefore, post-drying is required for obtaining a dry solvent. The ether solvent is tested on its peroxide content, for example with Quantofix® Peroxide Test Strips (Sigma-Aldrich) or Merckoquant™ test strips available from MERCK, prior to distillation or evaporation. One common error is distilling too close to dryness. For avoiding new generation of peroxides, it is best to leave a very small tolerable amount of water in the ether solvent.

The presence of such small amounts of water is exemplified in a UNEP (United Nations Environment Programme) publication of November 2003 on propylene glycol ethers as examined by OECD/SIDS. An analysis is given on page 167 of this report for Dowanol-DPnB (n-butoxypropoxypropanol or dipropylene glycol normal-butyl ether, CAS #29911-28-2) as reproduced by Table 2.

TABLE 2

| Dipropylene glycol n-butyl ether | 99.33% |
|---|---|
| Propylene glycol n-butyl ether | 0.49% |
| Water | 0.18% |
| Peroxides (as hydrogen peroxide) | 134 ppm |

Besides the possibility of an initial high content of peroxides after manufacturing, it has been observed that improper storage or repackaging may cause high peroxide content in ether solvents. Repackaging is performed by distributors who receive the ether solvents by tanker truck from manufacturers like Dow Chemical and require smaller volumes for easy commercialization.

Other Solvents

The maintenance liquid preferably contains only ether solvents according to Formula (I) or (II), but the maintenance liquid may contain also another type of solvent, preferably a cyclic solvent.

The maintenance liquid may include a small amount of water, preferably between 0.05 wt % and 5 wt %, more preferably between 0.10 wt % and 2 wt % but most preferably less than 1 wt % or none, with all wt % based upon the total weight of the maintenance liquid. At a water amount higher than 5 wt %, the maintenance liquid possesses a considerable evaporation rate.

In a preferred embodiment, the maintenance liquid includes also a cyclic solvent in an amount of up to 50 wt %, more preferably in an amount of up to 20 wt %, both based on the total weight of the maintenance liquid.

Suitable cyclic solvents include propylene carbonate, cyclic ether-based solvents, cyclic ester-based solvents, cyclic amide-based solvents, cyclic ketone-based solvents and N-alkyl-oxazolidinone-based solvents. The maintenance liquid containing a cyclic solvent can offer excellent cleaning performance because the cyclic solvent has a high ability to dissolve components contained in an inkjet ink such as resins.

The cyclic solvent is preferably liquid at 20° C. The cyclic solvent is preferably selected from the group consisting of propylene carbonate, N-alkyl-2-pyrrolidone, such as N-methyl-2-pyrrolidone and N-ethyl-2-pyrrolidone, and gamma-butyrolactone.

However in some embodiments, a cyclic solvent is not desirable because of incompatibility with inkjet print head resulting eventually in corrosion of vital components of the print head.

Polymerization Inhibitors

The maintenance liquid may include a polymerization inhibitor.

Suitable polymerization inhibitor to be incorporated into the maintenance liquid according to preferred embodiments of the present invention, are compounds which are capable of supplementing radicals. For example, it is possible to employ hydroquinone, phenol derivatives such as 4-methoxyhydroxy benzene, and oxygen/sulphur-containing compounds such as phenothiazine. It is also possible to employ other compounds such as methoquinone, butylhydroxytoluene, DOHQ (Wako Co., Ltd.) and DHHQ (Wako Co., Ltd.).

As for the cationic polymerization inhibitor, it is possible to employ any kind of base or base generating compound which can be dissolved in the maintenance liquid. The cationic polymerization inhibitor may be an inorganic base or an organic base, preferably an organic base in view of solubility in ether solvents. Specific examples of such an organic base include ammonia or ammonium compounds, substituted or unsubstituted alkyl amines, substituted or unsubstituted aromatic amines, and organic amines having a heterocyclic skeleton such as pyridine, pyrimidine and imidazole. More specifically, it is possible to employ n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and 1,3-benzenesulfonyl hydrazide. Ammonium compounds can be also employed as a basic compound. These basic compounds can be employed singly or in combination of two or more. Further, pyridine derivatives, aniline derivatives, aminonaphthalene derivatives, other kinds of nitrogen-containing heterocyclic compounds and the derivatives thereof can be also suitably employed.

Surfactants and Pigment Dispersants

If required, surfactants or pigment dispersants may be added to the maintenance liquid.

Surfactants can be advantageously used for wetting the interior surface of the ink circuit and print head, while pigment dispersants can help redisperse precipitated colour pigment in the ink circuit or print head. The pigment dispersing agents may be polymer type dispersing agents as used for dispersing the colour pigments in the inkjet ink, such as e.g. SOLSPERSE™ dispersants available from NOVEON and DISPERBYK™ dispersants available from BYK CHEMIE GMBH.

These additives are employed at a mixing ratio that would not deteriorate the performance of the washing solution. In a preferred embodiment, no surfactants or pigment dispersants are used in the maintenance liquid. Their absence is not only preferred because they may cause foaming in certain conditions, but also when the maintenance liquid is used for cleaning the nozzle plate, the surfactant remains largely on the nozzle plate after evaporation of the ether solvent. The presence of surfactant on the nozzle plate deteriorates the non-wetting properties of a nozzle plate and leads to smudge on the nozzleplate which is difficult to remove especially in the case of UV curable inkjet inks.

Inkjet Printers

In a preferred embodiment, an inkjet printer comprising an inkjet print head, most preferably a UV curable inkjet printer, is filled with a maintenance liquid as described above.

The maintenance liquid can be used in solvent based inkjet printers, but is advantageously used in UV curable inkjet printers in view of the possible interaction between peroxides and UV curable inkjet inks, such as (meth)acrylate based inkjet inks. The possibility of using the same type of maintenance liquids for different types of inkjet printers allows for a smaller stock.

The inkjet printer may have one or more inkjet print heads scanning back and forth in a transversal direction across the moving ink receiving surface. However, the beneficial effect of the maintenance liquid is even more observed if the inkjet printing is performed by a so-called single pass printing process. This can be accomplished by using page wide inkjet print heads or multiple staggered inkjet print heads which cover the entire width of the ink-receiving surface. In a single pass printing process the inkjet print heads usually remain stationary and the ink-receiving surface is transported under the inkjet print heads. The effect of a failing nozzle in single pass printing is much more visible than in multi pass inkjet printing. In a preferred embodiment, the inkjet printer comprising an inkjet print head is filled with a maintenance liquid is a single pass inkjet printer.

Methods for Cleaning Inkjet Printers

In a preferred embodiment according to the present invention, the maintenance liquid is used in a method for cleaning an inkjet printer and inkjet print head, more specifically the nozzle plate of an inkjet print head.

The maintenance liquid can be used to clean the nozzle plate of an inkjet print head manually or automatically. Suitable techniques for cleaning the nozzle plate of an inkjet print head are a cleaning system as shown by US 2004085390 A (SEIKO EPSON) and EP 2540505 A (AGFA) using one or more brushes or EP 1440803 A (AGFA) using one or more wipers.

In a preferred embodiment, the method for cleaning an inkjet printer involves filling the interior of an inkjet print head with the maintenance liquid as described above.

In a very preferred embodiment, the method for cleaning an inkjet printer is a cleaning method performed on a UV curable inkjet printer.

EXAMPLES

Materials

All materials used in the examples were readily available from standard sources such as Sigma-Aldrich (Belgium) and Acros (Belgium) unless otherwise specified.

AMG2 is :Anapurna™ M G2 Yellow ink, a UV curable yellow acrylate based inkjet ink available from Agfa Graphics NV.

JAHDC is :Jeti Anuvia™ HDC Cyan ink, a UV curable cyan acrylate based inkjet ink available from Agfa Graphics NV.

DPNB is Dowanol™ DPnB, a dipropylene glycol n-butyl ether available from Dow Chemical Company having a boiling point at 760 mm Hg of 230° C., a viscosity at 25° C. of 4.9 mPa·s and a surface tension of 28.4 mN/m at 25° C.

TPM is Dowanol™ TPM, a tripropylene glycol methyl ether available from Dow Chemical Company having a boiling point at 760 mm Hg of 243° C., a viscosity at 25° C. of 5.5 mPa·s and a surface tension of 30.0 mN/m at 25° C.

DMM is Proglyde™ DMM, a dipropylene glycol dimethyl ether having a boiling point at 760 mm Hg of 175° C., a viscosity at 25° C. of 1.0 mPa·s and a surface tension of 26.3 mN/m at 25° C.

PC is propylene carbonate available from ALDRICH.

Maintmix is a maintenance liquid composed of 50 wt % PC and 50 wt % Dowanol™ TPM.

DPGDA is dipropyleneglycoldiacrylate from SARTOMER. Cupferron™ AL is aluminum N-nitrosophenylhydroxylamine from WAKO CHEMICALS LTD.

Stabi-1 is a mixture forming a polymerization inhibitor having a composition according to Table 3.

TABLE 3

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Merckoquant™ test strips are available from MERCK.

Measurement Methods

1. Peroxide Test

The peroxide concentration was measured semi-quantitatively by visual comparison of the reaction zone of a Merckoquant™ test strip with the fields of a calibrated colour scale. Peroxidase transfers peroxide oxygen to an organic redox indicator. This produces a blue oxidation product. The Merckoquant™ test strips have a colour scale including colour fields for a peroxide content as shown by Table 4.

TABLE 4

| Merckoquant ™ test strip | Colour scale includes colour fields for |
|---|---|
| Cat. No. 1.10011.0001 | 0.5-2-5-10-25 ppm |
| Cat. No. 1.10081.0001 | 1-3-10-30-100 ppm |
| Cat. No. 1.10337.0001 | 100-200-400-600-800-1000 ppm |

The reaction zone of the test strip was immersed in the sample at a temperature of 25° C. for 1 second. Excess liquid was allowed to run off via the long edge of the strip onto an absorbent paper towel. After 15 seconds the reaction zone was compared with the best corresponding colour field on the colour scale in order to determine the peroxide content in mg/L $H_2O_2$.

2. Viscosity

The viscosity of the primer was measured using a Brookfield DV-II+ viscometer at 45° C. at 12 rotations per minute (RPM) using a CPE 40 spindle. This corresponds to a shear rate of $1,000\ s^{-1}$.

3. Oxygen Content

The oxygen of a maintenance liquid was determined using a Oxyscan Light UMS oxygen sensor 201™ available from UMS GmbH & Co. KG.

Example 1

This example illustrates the effect of the peroxide concentration in a maintenance liquid if it would interact with a UV curable inkjet ink in the inside of a UV curable inkjet printer.

Preparation and Evaluation of Maintenance Liquid—Inkjet Ink Mixtures

Mixtures Mix-1 to Mix-12 were prepared according to Table 5 of :Anapurna™ M G2 Yellow ink with Dowanol™ DPnB having different peroxide concentrations, and optionally including also the polymerization inhibitor Stabi-1. The high amount used of Dowanol™ DPnB reflects a cleaning process of an inkjet printer where most the UV curable inkjet ink is removed. The wt % are all bases on the total weight of the mixture. The viscosity of the mixtures Mix-1 to Mix-12 was determined directly after preparation and after storing them in a closed container for 6 days at 80° C.

TABLE 5

| Mixture | wt % of AMG2 | wt % of DPNB | Stabi-1 | Peroxide Test on DPNB | Viscosity | Viscosity after 6 days at 80° C. |
|---|---|---|---|---|---|---|
| Mix-1 | 10 | 90 | 0 | 2 ppm | 4 mPa·s | 4 mPa·s |
| Mix-2 | 10 | 90 | 0 | 5-10 ppm | 4 mPa·s | 3 mPa·s |
| Mix-3 | 10 | 90 | 0 | 10-25 ppm | 4 mPa·s | 4 mPa·s |
| Mix-4 | 10 | 90 | 0 | 100-200 ppm | 3 mPa·s | gel matter |
| Mix-5 | 10 | 90 | 0 | 200 ppm | 4 mPa·s | gel matter |
| Mix-6 | 10 | 90 | 0 | 1000 ppm | 4 mPa·s | gel matter |
| Mix-7 | 10 | 82 | 8 | 2 ppm | 4 mPa·s | 4 mPa·s |
| Mix-8 | 10 | 82 | 8 | 5-10 ppm | 4 mPa·s | 4 mPa·s |
| Mix-9 | 10 | 82 | 8 | 10-25 ppm | 4 mPa·s | 4 mPa·s |
| Mix-10 | 10 | 82 | 8 | 100-200 ppm | 4 mPa·s | gel matter |
| Mix-11 | 10 | 82 | 8 | 200 ppm | 4 mPa·s | gel matter |
| Mix-12 | 10 | 82 | 8 | 1000 ppm | 5 mPa·s | gel matter |

From Table 5, it should be clear that at too high peroxide concentration an observation was made of gel-like particulate matter in the mixture which precipitates. This gellification is assumed to be undesired polymerization initiated by the peroxides in the mixture. It can also be seen that addition of typical polymerization inhibitors of a UV curable inkjet ink were not capable of inhibiting the peroxide initiation. At low peroxide contents of up to 25 ppm no undesired gel matter was observed. As UV curable inkjet inks are usually heated to temperatures of 45° C. to 65° C. in the ink circuit and print head of an inkjet printer, a prolonged test performed at 80° C. for six days with the ink mixtures ensures a reliable extrapolation of the obtained results to the real life maintenance of a UV curable inkjet printer.

Example 2

This example illustrates that peroxide concentrations in a maintenance liquid of less than 5 ppm deliver superior results when mixed with a UV curable inkjet ink even at larger ratios of maintenance liquid to UV curable inkjet ink.

Preparation and Evaluation of Maintenance Liquid—Inkjet Ink Mixtures

Mixtures Mix-13 to Mix-20 were prepared according to Table 6 of :Jeti Anuvia™ HDC Cyan ink with Dowanol™ DPnB having different peroxide concentrations. The wt % are all bases on the total weight of the mixture. The viscosity of the mixtures Mix-13 to Mix-20 was determined directly after preparation and after storing them in closed containers for 7 days at 45° C. and for 7 days at 80° C.

TABLE 6

| Mixture | wt % of JAHDC | wt % of DPNB | Peroxide Test | Viscosity | Viscosity after 7 days at 45° C. | Viscosity after 7 days at 80° C. |
|---|---|---|---|---|---|---|
| Mix-13 | 10 | 90 | 2 ppm | 3 mPa·s | 3 mPa·s | 4 mPa·s |
| Mix-14 | 5 | 95 | 2 ppm | 3 mPa·s | 3 mPa·s | 3 mPa·s |
| Mix-15 | 1 | 99 | 2 ppm | 3 mPa·s | 3 mPa·s | 3 mPa·s |
| Mix-16 | 10 | 90 | 5-10 ppm | 3 mPa·s | 3 mPa·s | 5 mPa·s |
| Mix-17 | 5 | 95 | 5-10 ppm | 3 mPa·s | 3 mPa·s | 5 mPa·s |
| Mix-19 | 10 | 90 | 10-25 ppm | 3 mPa·s | 3 mPa·s | 10 mPa·s |
| Mix-20 | 5 | 95 | 10-25 ppm | 3 mPa·s | 3 mPa·s | 5 mPa·s |

A higher weight ratio of DPNB to JAHDC reflects an inkjet printer where more UV curable inkjet ink is removed (cleaned) from the inkjet printer. It can be seen that mixtures having peroxide concentrations of less than 5 ppm gave good results as at all DPNB:JAHDC ratio's of 90:10 to 99:1.

Example 3

This example illustrates the effect of peroxide on cleaning of the UV curable inkjet printer :Anapurna Mv and restarting printing after standstill.
Evaluation Two maintenance liquids DPNB-1 and DPNB-2 both consisting of DPNB but having different peroxide content were selected as shown by Table 7.

TABLE 7

| Maintenance Liquid | Peroxide Test | 90:10 mixture with AMG2 Viscosity after 1 week at 80° C. |
|---|---|---|
| DPNB-1 | 2 ppm | OK |
| DPNB-2 | 50 ppm | Not OK |

An :Anapurna Mv inkjet printer which was printing the UV curable inkjet ink AMG2 was efficiently, excellently cleaned and then filled using the maintenance liquid DPNB-1. After one week, the maintenance liquid DPNB-1 was discharged from the inkjet printer via the print head operating at 45° C. and the inkjet printer was again loaded with UV curable inkjet ink AMG2. On printing test images no 'failing nozzles' were observed in the test images. Failing nozzles occur when small gel-like matter clog a nozzle. When a nozzle of an inkjet print head is clogged, this results in an interruption of the image due to the lack of deposited ink. The oxygen content of DPNB-1 was determined as being 8.53 mg/L.

The same :Anapurna Mv inkjet printer which was then cleaned and filled using the maintenance liquid DPNB-2. After one week, the maintenance liquid DPNB-2 was discharged from the inkjet printer via the print head operating at 45° C. and the inkjet printer was again loaded with UV curable inkjet ink AMG2. On printing test images several 'failing nozzles' were observed in the test images.

Both maintenance liquids DPNB-1 and DPNB-2 were also mixed in a ratio of maintenance liquid to AMG2 ink of 90 to 10, together with some other maintenance liquids listed in Table 8. The viscosity was measured after preparation and again after a heat treatment of 1 week at 80° C. A clear viscosity increase was only observed for the maintenance liquids DPNB-2 and TPM.

TABLE 8

| Maintenance Liquid | Peroxide Test | AMG2 |
|---|---|---|
| DPNB-1 | 2 ppm | OK |
| DPNB-2 | 50 ppm | Not OK |
| DMM | 0.5 ppm | OK |
| Maintmix | 0.5 ppm | OK |
| TPM | 50 ppm | Not OK |

The invention claimed is:

1. A maintenance liquid for inkjet printers, the maintenance liquid comprising:
at least 50 wt % of at least one ether solvent according to Formula (I) or (II) with the wt % is based on a total weight of the maintenance liquid:

$R^1(CO)_x(OR^2)_yOR^3$      Formula (I)

$R^4CO(OR^5)_zOCOR^6$      Formula (II);

wherein
$R^1$, $R^4$, and $R^6$ independently represent an alkyl group having 1 to 4 carbon atoms;
$R^2$ rand $R^5$ independently represent an ethylene group or a propylene group;
$R^3$ represents a hydrogen atom or an alkyl group having 1 to 4 carbon atoms;
x represents an integer of 0 or 1;
y and z independently represent an integer of 1 to 4; and
the maintenance liquid contains no more than 25 ppm of peroxide expressed as hydrogen peroxide.

2. The maintenance liquid according to claim 1, wherein the at least one ether solvent according to Formula (I) has a boiling point of at least 160° C. at 760 mm Hg.

3. The maintenance liquid according to claim 1, wherein the at least one ether solvent according to Formula (I) is selected from the group consisting of dipropylene glycol n-butyl ether, tripropylene glycol n-butyl ether, dipropylene glycol n-propyl ether, dipropylene glycol dimethyl ether, tripropylene glycol methyl ether, tetraethylene glycol dimethyl ether, diethylene glycol ethyl ether acetate, dipropylene glycol diacetate, dipropylene glycol monomethyl ether acetate, and diethylene glycol n-butyl ether acetate.

4. The maintenance liquid according to claim 1, wherein the at least one ether solvent according to Formula (I) is present in an amount of at least 80 wt % based on the total weight of the maintenance liquid.

5. The maintenance liquid according to claim 1, wherein the maintenance liquid has a viscosity of less than 15 mPa·s at 25° C.

6. The maintenance liquid according to claim 1, wherein the maintenance liquid contains between 0.1 and 5.0 ppm of peroxide expressed as hydrogen peroxide.

7. The maintenance liquid according to claim 1, wherein the maintenance liquid contains less than 10.0 mg/L of dissolved oxygen.

8. The maintenance liquid according to claim 1, wherein the maintenance liquid includes a cyclic solvent selected from the group consisting of propylene carbonate, N-methyl-2-pyrrolidone, N-ethyl-2-pyrrolidone, and gamma-butyrolactone.

9. The maintenance liquid according to claim 1, wherein the maintenance liquid includes a polymerization inhibitor.

10. An inkjet printer comprising:
an inkjet print head containing the maintenance liquid according to claim 1.

11. The inkjet printer according to claim 10, wherein the inkjet printer is a UV curable inkjet printer.

12. A method for cleaning an inkjet printer, the method comprising the step of:
cleaning the inkjet printer using the maintenance liquid according to claim 1.

13. The method for cleaning an inkjet printer according to claim 12, the method further comprising the step of:
cleaning a nozzle plate of an inkjet print head using the maintenance liquid.

14. The method for cleaning an inkjet printer according to claim 12, the method further comprising the step of:
providing an interior of an inkjet print head with the maintenance liquid.

15. The method for cleaning an inkjet printer according to claim 12, wherein the inkjet printer is a UV curable inkjet printer.

* * * * *